Patented Feb. 21, 1933

1,898,790

UNITED STATES PATENT OFFICE

PAUL F. SCHLINGMAN, OF SCHENECTADY, NEW YORK, ASSIGNOR TO GENERAL ELECTRIC COMPANY, A CORPORATION OF NEW YORK

METHOD OF PREPARING RESINOUS COMPOSITIONS

No Drawing.    Application filed December 6, 1929. Serial No. 412,295.

This invention is concerned with a new and improved process relating to the production of resinous compositions resulting from the chemical combination of drying and semi-drying oils with the reaction ingredients of alkyd resins.

As is well known, alkyd resins include all those complexes resulting primarily from the inter-reaction of polyhydric alcohols and polybasic acids. The primary object of this invention is to provide an improved method whereby oils of the drying or semi-drying type may be completely combined chemically with the alcohol and acid ingredients used in the production of alkyd resins. According to the method which I have developed it is possible to chemically combine practically without limit any percentage of oil with the resin ingredients and obtain a product which has no appreciable amount of free oil present therein.

In general, my invention is carried out by first heating the acid alkyd resin ingredient to a temperature where it will react with the oil employed. The oil is then added very slowly (drop by drop and with stirring if necessary) to the acid ingredient in a suitably heated container wherein the reaction of oil and acid takes place under reflux conditions. The oil must be slowly added so that the acid ingredient is always present in stoichiometric excess. This is important because it is under such conditions that the oil is caused first to decompose into its primary constituents because of the action of the trace of water which is always present with the oil. This will be more apparent if the following is considered:

Since there is always a slight amount of water present in the oil there is always an equilibrium condition at the temperatures employed which may be conveniently expressed as follows:

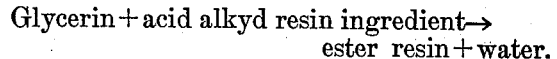

This equilibrium is such that the amounts of glycerine and oil acids are small. In the presence of an acid alkyd resin ingredient the above equilibrium condition is disturbed due to the reaction of the acid alkyd resin ingredient with the glycerine produced by the hydrolysis of the oil, as shown by the right hand side of the equation, yielding an ester resin and liberating water. This may be expressed in equation form as follows:

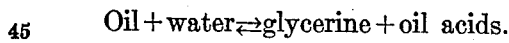

The water so formed (which is the same amount as originally present in the oil), in turn acts to again hydrolyze more oil and yield again more glycerine and oil acids; and so the cycle continues. The oil is therefore continuously hydrolyzed to the products glycerine and oil acids, the former of which is removed by an acid alkyd resin ingredient forming an ester resin and water. It will be apparent, therefore, that to insure the complete combination of all the oil used, whatever be the percentage employed, the oil must be added under the exact conditions specified. The reflux conditions are important to keep the small amount of water present in the system so that the reactions may go on.

Having completely chemically combined the oil and the acid ingredient, the reaction mass now consists of ester resin, oil acids, water and the excess of acid alkyd resin ingredient employed. The accurate combining amount (or stoichiometric proportion) of alcohol alkyd resin ingredient necessary to combine with the acid alkyd resin ingredient remaining is now added. This alcohol ingredient reacts with the mass in the following manner:

The alcohol ingredient combines with the excess of remaining acid resin ingredient to form more ester resin. Depending upon the completeness of the esterification which has taken place, there is present in the reaction mass more or less free hydroxy groups which are reacted upon by the remaining oil acids to form finally a mixed ester resin. The final product is therefore a chemical combination comprising mixed ester resins and containing no appreciable amount of free oil therein.

While it is not necessary to add the alcohol ingredient with the same degree of caution as was exercised in the addition of the oil, nevertheless, it should not be added too rapidly. After the alcohol ingredient has been added the reaction is completed by heating the mass at the proper temperature and for the appropriate time to give the desired product. If desired, the reflux apparatus may be removed at the end of the addition of the alcohol ingredient and the heating continued to allow the escape of the trace of water present. Such a procedure will yield a more highly water-resistant product.

My invention will be more clearly understood by referring to the following specific examples of the method employed. It is to be understood, however, that these examples are merely illustrative and that any oil glyceride, that is, any drying or semi-drying oil, may be used with any acid and alcohol alkyd resin ingredients and that the proportions employed are not limiting proportions. As far as I am aware, any amount of oil may be used and caused to completely and chemically combine with the resin ingredients to yield a product having no appreciable amount of free oil present therein, when the procedure of my invention is employed.

*Example 1*

243 grams of phthalic anhydride are heated to about 270° C. in a container provided with a reflux condenser. 200 grams of linseed oil are slowly added drop by drop. The temperature is maintained approximately between 270° and 300° C. throughout the operation of adding the oil to the acid. After all the oil has been added, 100 grams of glycerine are slowly added to the mass. The temperature may be dropped to 200° C. during the addition of the glycerine. Ordinarily, the resinous product is formed by the time all of the glycerine has been added. However, further heating may be necessary or desirable, depending upon the type of product desired. In this example a resinous composition having 36.8 per cent by weight of linseed oil chemically combined therewith is obtained.

By using the following proportions of resinous composition containing no applicable amount of free oil and 75% by weight of linseed oil chemically combined therewith is obtained: 81 grams phthalic anhydride, 33 grams of glycerine, 343 grams of linseed oil. The process is exactly the same as outlined above.

*Example 2*

118 grams of phthalic anhydride together with 63 grams of rosin are heated as in Example 1. 92 grams of linseed oil, 18 grams of Chinawood oil, and 8 grams of castor oil are then added in the manner set forth in Example 1. 56 grams of glycerine are added and the reaction completed as outlined above. This gives a resinous product containing 33.2% by weight of oil in chemical combination.

*Example 3*

The following formula is used carrying out the process exactly as outlined in Example 1 and the product has 38% by weight of oil in chemical combination therewith. 125 grams of phthalic anhydride, 35 grams of water-white rosin, 115 grams of linseed oil, 18 grams of castor oil and 56 grams of glycerine.

*Example 4*

With the following formula and using the process outlined in Example 1, a resinous product containing 25.5% by weight of oil chemically combined therewith is obtained, 163.4 grams of phthalic anhydride, 112.65 grams of water-white rosin, 61.75 grams of linseed oil, 62.0 grams of Chinawood oil, 65.3 grams of glycerine and 21.1 grams of ethylene glycol.

*Example 5*

The following formula is used carrying out the process exactly as outlined in Example 1, and the product has 53.75% by weight of oil in chemical combination therewith. 191 grams of phthalic anhydride, 92 grams of glycerine, 95 grams of copal, 70 grams of cottonseed oil, 95 grams of Chinawood oil, 275 grams of linseed oil.

What I claim as new and desire to secure by Letters Patent of the United States is:—

1. The method of incorporating into an alkyd resin unlimited chemically combining proportions of oil glyceride, the resulting product containing no appreciable amount of free oil therein, which consists in heating under reflux conditions a polybasic organic acid to a temperature at which it will react with the oil glyceride employed, adding thereto the oil glyceride at such a rate that chemical combination therewith will be effected, the acid always being in chemical excess of the oil glyceride, slowly adding a polyhydric alcohol and completing the esterification.

2. The method of incorporating into an alkyd resin unlimited chemically combining proportions of oil glyceride, the resulting product containing no appreciable amount of free oil therein, which consists in heating under reflux conditions phthalic anhydride to a temperature at which it will combine chemically with an oil glyceride, adding the oil glyceride to the phthalic anhydride at such slow rate that there is always present a chemical excess of phthalic anhydride, in the mass, then slowly adding to the chemically combined mass glycerine, and heating until resinification occurs.

3. The method of incorporating into an alkyd resin unlimited chemically combining proportions of oil glyceride, the resulting product containing no appreciable amount of free oil therein, which consists in heating phthalic anhydride in a container provided with a reflux condenser to about 270° C., slowly adding thereto an oil glyceride at such a rate as to effect complete chemical combination therewith, then slowly adding glycerine to combine with the reaction mass.

4. The method of incorporating into an alkyd resin unlimited chemically combining proportions of a drying oil, the resulting product containing no appreciable amount of free oil therein, which consists in heating under reflux conditions a desired amount of phthalic anhydride to about 270° C., slowly adding thereto a desired amount of a drying oil at such a rate as to effect chemical combination therewith, then slowly adding a combining amount of glycerine at about 200° C., and heating the product to the desired state of resinification.

5. The method of incorporating into a resinous product of the alkyd type unlimited chemically combining proportions of oil glyceride, the resulting product containing a natural resin incorporated therewith and no appreciable amount of free oil, which consists in first chemically combining under reflux conditions the oil glyceride with a polybasic aromatic acid and a natural resin by adding the oil glyceride to the acid and natural resin at such a rate that there is always present a chemical excess of acid in the mass and after chemically combining the ingredients, esterifying the combination with a polyhydric alcohol.

6. The process of incorporating into an adkyd resin unlimited chemically combining proportions of oil glyceride, the resulting product containing no appreciable amount of free oil therein which consists in reacting an oil glyceride with a polybasic organic acid in the presence of a trace of water and under conditions whereby the water is continuously kept in the system, carrying out the reaction by slowly adding the oil glyceride to the acid at a rate to effect complete chemical combination therewith, and after adding all the acid, reacting the product so obtained with a polyhydric alcohol.

7. The process of incorporating into a resinous composition of the alkyd type unlimited chemically combining proportions of an oil of the drying or semi-drying type, the resulting product containing no appreciable amount of free oil therein, which consists in reacting the oil, phthalic anhydride and glycerine in the presence of a trace of water in a container under conditions whereby the water is continuously kept in the system, as follows: heating the phthalic anhydride to between 270° C. and 300° C., slowly adding thereto the oil at such a rate that there is always present a chemical excess of phthalic anhydride, and after all the oil has been added, adding to the reacted mass the glycerine and completing the esterification open the the atmosphere.

In witness whereof, I have hereunto set my hand this 5th day of December, 1929.

PAUL F. SCHLINGMAN.

CERTIFICATE OF CORRECTION.

Patent No. 1,898,790.                           February 21, 1933.

PAUL F. SCHLINGMAN.

It is hereby certified that error appears in the printed specification of the above numbered patent requiring correction as follows: Page 2, line 52, for "of" read "a", and line 53, for "applicable" read "appreciable"; page 3, line 71, for "the" first occurrence read "to"; and that the said Letters Patent should be read with these corrections therein that the same may conform to the record of the case in the Patent Office.

Signed and sealed this 9th day of May, A. D. 1933.

(Seal)

M. J. Moore,
Acting Commissioner of Patents.